(12) United States Patent
Diego Regla et al.

(10) Patent No.: US 11,496,821 B2
(45) Date of Patent: Nov. 8, 2022

(54) EXTERNAL MICROPHONE ACTIVE INGRESS PROTECTION

(71) Applicant: HARMAN INTERNATIONAL INDUSTRIES, INCORPORATED, Stamford, CT (US)

(72) Inventors: Pablo Diego Regla, Budapest (HU); Viktor Dobos, Kecskemét (HU); Zsolt Marton, Zalaegerszeg (HU); Zoltán Giang-Son Kleinheincz, Pillsborosjenö (HU)

(73) Assignee: Harman International Industries, Incorporated, Stamford, CT (US)

( * ) Notice: Subject to any disclaimer, the term of this patent is extended or adjusted under 35 U.S.C. 154(b) by 8 days.

(21) Appl. No.: 17/245,743

(22) Filed: Apr. 30, 2021

(65) Prior Publication Data

US 2021/0352393 A1 Nov. 11, 2021

Related U.S. Application Data

(60) Provisional application No. 63/020,203, filed on May 5, 2020.

(51) Int. Cl.
| | |
|---|---|
| *H04R 1/02* | (2006.01) |
| *H04R 3/00* | (2006.01) |
| *B60R 11/00* | (2006.01) |
| *H04R 1/08* | (2006.01) |
| *H04R 1/04* | (2006.01) |
| *B60R 11/02* | (2006.01) |

(52) U.S. Cl.
CPC .......... *H04R 1/086* (2013.01); *B60R 11/0247* (2013.01); *H04R 1/04* (2013.01); *H04R 3/007* (2013.01); *B60R 2011/004* (2013.01); *H04R 2499/13* (2013.01)

(58) Field of Classification Search
CPC . H04R 1/00; H04R 1/02; H04R 1/028; H04R 1/04; H04R 1/08; H04R 1/086; H04R 3/00; H04R 3/007; H04R 29/00; H04R 29/004; H04R 2499/13; B60R 11/00; B60R 11/02; B60R 11/0247; G60R 2011/004
See application file for complete search history.

(56) References Cited

U.S. PATENT DOCUMENTS

| | | | |
|---|---|---|---|
| 10,154,328 B2 * | 12/2018 | Watson | H04R 19/04 |
| 10,945,060 B2 * | 3/2021 | Riemann | H04R 1/08 |
| 11,310,578 B2 * | 4/2022 | Kleinheincz | H04R 1/08 |
| 2020/0343627 A1 * | 10/2020 | Gahner | H04R 1/086 |

FOREIGN PATENT DOCUMENTS

EP 3703385 A1 * 9/2020 ............. B60R 11/00

* cited by examiner

*Primary Examiner* — Thang V Tran
(74) *Attorney, Agent, or Firm* — Brooks Kushman, P.C.

(57) ABSTRACT

A microphone apparatus for attachment to an exterior portion of a vehicle, the apparatus may include a housing maintaining a printed circuit board (PCB) and a microphone element positioned on the PCB, a sealing element arranged on one side of the housing and defining at least one housing opening, and a cover extending over the sealing element and defining a cover opening configured to align in an open state with the housing opening to enable ambient sound external to the vehicle to be transmitted to the microphone element, the cover configured to block the housing opening in a closed state to protect the microphone element.

20 Claims, 7 Drawing Sheets

EXTERNAL MICROPHONE ACTIVE INGRESS PROTECTION

CROSS-REFERENCE TO RELATED APPLICATIONS

This application claims the benefit of U.S. provisional application Ser. No. 63/020,203, filed May 5, 2020, the disclosure of which is hereby incorporated in its entirety by reference herein.

TECHNICAL FIELD

Aspects disclosed herein generally related to an external microphone apparatus. In one example, the external microphone apparatus is arranged to withstand environmental conditions that are present external to a vehicle. These aspects and others will be discussed in more detail below.

BACKGROUND

Microphones may need to be packaged on an exterior portion of an automobile to support any number of vehicle applications to detect sound outside to the vehicle. Such microphones may need to be impervious to various environmental conditions such as wind, rain, snow, etc. Additionally, such microphones may be positioned on "Class A" surfaces of the vehicle exterior and should provide an appealing aesthetic appearance for vehicle occupants to accentuate the exterior styling of the vehicle.

SUMMARY

In at least one embodiment, a microphone apparatus for attachment to an exterior portion of a vehicle, the apparatus may include a housing maintaining a printed circuit board (PCB) and a microphone element positioned on the PCB, a sealing element arranged on one side of the housing and defining at least one housing opening and a cover extending over the sealing element and defining a cover opening configured to align in an open state with the housing opening to enable ambient sound external to the vehicle to be transmitted to the microphone element, and the cover configured to block the housing opening in a closed state to protect the microphone element.

In at least another embodiment, a microphone apparatus for attachment to an exterior portion of a vehicle, the apparatus may include a housing maintaining a printed circuit board (PCB) and a microphone element positioned on the PCB, a sealing element arranged on one side of the housing and defining at least one housing opening to enable ambient sound external to the vehicle to be transmitted to the microphone element, and a lid extending over the sealing element and movable between an open state and a closed state, the lid configured to cover the housing opening in the closed state to protect the microphone element from environmental conditions.

In at least another embodiment, a microphone system for protecting a microphone on an exterior of a vehicle may include a housing maintaining a printed circuit board (PCB) and a microphone element positioned on the PCB, a sealing element arranged on one side of the housing and defining at least one housing opening to enable ambient sound external to the vehicle to be transmitted to the microphone element, a cover element extending over the sealing element and configured to affect an open and a closed state on the sealing element, and a controller configured to receive an indication of an environment condition relevant to microphone protection, and in response to the indication, instruct at least one of the housing and the cover element to move to the closed state.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 2A illustrates the external microphone apparatus in an open position, FIG. 2B illustrates the external microphone apparatus in a closing position, FIG. 2C illustrates the external microphone apparatus in a closed position, FIG. 2D illustrates the external microphone apparatus in an opening position;

FIG. 3A illustrates the external microphone apparatus in an open position, FIG. 3B illustrates the external microphone apparatus in a closing position, FIG. 3C illustrates the external microphone apparatus in a closed position, FIG. 3D illustrates the external microphone apparatus in an opening position;

FIG. 4A illustrates the external microphone apparatus in an open position, FIG. 4B illustrates the external microphone apparatus in a closing position, FIG. 4C illustrates the external microphone apparatus in a closed position, FIG. 4D illustrates the external microphone apparatus in an opening position;

FIG. 5A illustrates the external microphone apparatus in an open position, FIG. 5B illustrates the external microphone apparatus in a closing position, FIG. 5C illustrates the external microphone apparatus in a closed position, FIG. 5D illustrates the external microphone apparatus in an opening position;

FIG. 6A illustrates the external microphone apparatus in an open position, FIG. 6B illustrates the external microphone apparatus in a closing position, FIG. 6C illustrates the external microphone apparatus in a closed position, FIG. 6D illustrates the external microphone apparatus in an opening position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Due to the development of autonomous driving in the automotive industry, it has become helpful to detect sounds from the outside (or external environment) of the vehicle (i.e., traffic, pedestrians, emergency sirens, etc.). This may require installing any number of microphones on an exterior of the vehicle. For proper functionality, the microphone has to withstand environmental conditions, such as wind, water, dust, mud, ice, etc. However, the microphone may also need to be able to withstand other forms of surrounding environments, such as heat and water pressure produced during washing of the vehicle.

The external microphone apparatus as disclosed herein is generally arranged to withstand such conditions and is configured to protect a microphone device from the heat and water pressure that may be created by a waterjet used to wash the vehicle. For example, the waterjet may be a hose or spray mechanism to spray down the vehicle. The waterjet may also be part of an automated car wash system. In one example, the apparatus may physically close off and protect the channel into the microphone device to prevent any water or heat from reaching the microphone when the microphone is not required for detecting exterior sounds. This may be achieved by a latch apparatus such as a piezoelectric, magnetic, or mechanically activated system to cover the opening.

Specifically, the microphone assembly may include of a printed circuit board (PCB) with a Micro-Electro-Mechanical Systems (MEMS) (micro-electromechanical system) based microphone, located inside a housing and protected to the exterior with an acoustic membrane. A sealing element may be arranged between the microphone and the cover or car body to improve the acoustic transmission of the soundwaves to the microphone, avoiding undesired sound leakages. The acoustic membrane may protect the microphone while working (in opened position), and when the potential damage of the microphone could happen (e.g., car wash, vehicle is parked), the protection system may be activated, closing the connection between the outside and the microphone. These aspects and others will be discussed in more detail below.

Figure 1:
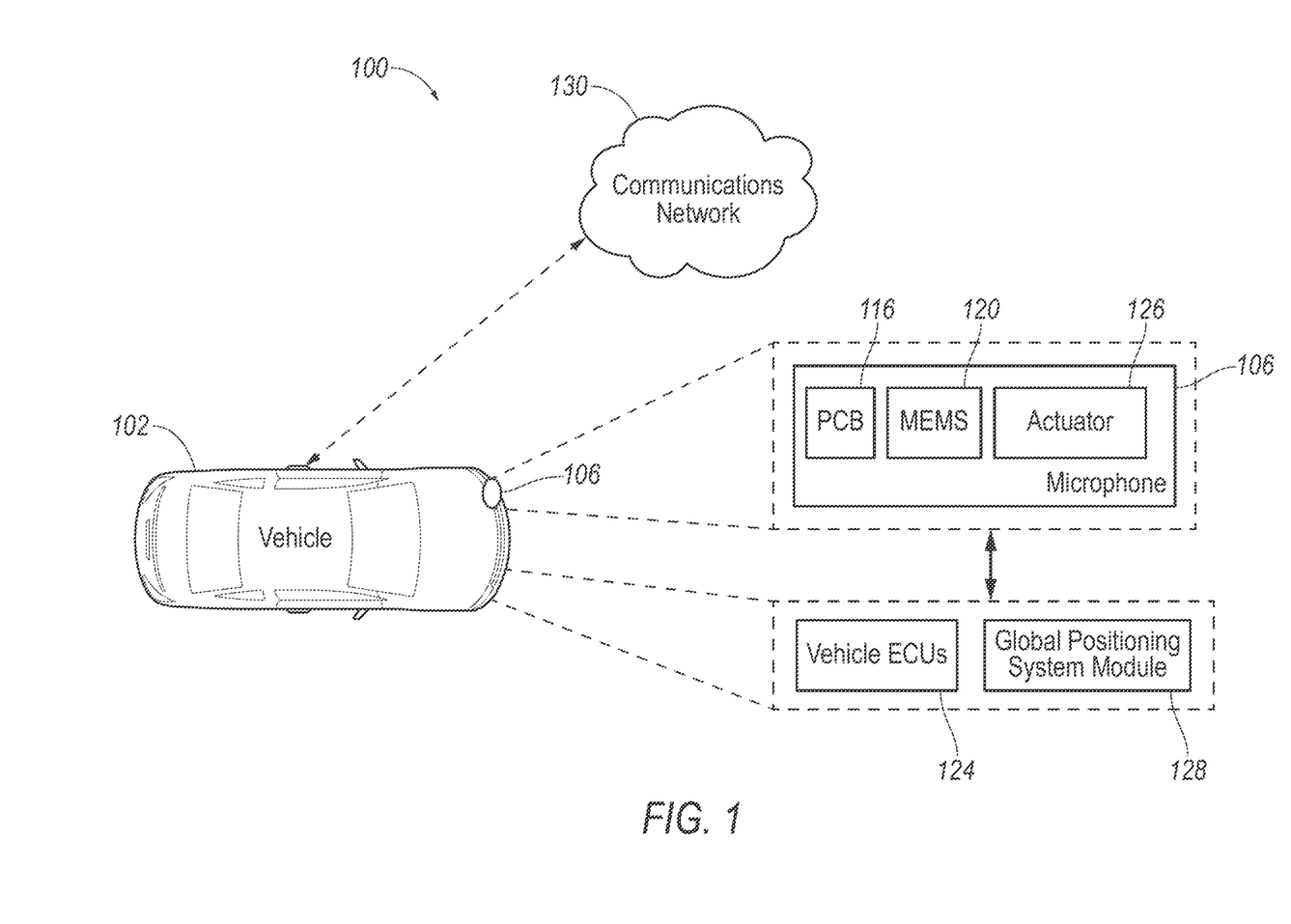
FIG. 1 illustrates an example microphone system.

FIG. 1 illustrates an example microphone system 100 for a vehicle 102. The vehicle 102 may be an autonomous vehicle or employ autonomous features. These features may be facilitated and enabled by sounds acquired from a microphone apparatus 106. The apparatus 106 is generally configured to be mounted to any exterior portion of the vehicle 102. For example, the apparatus 106 may be positioned on a front or rear bumper, any door of the vehicle, side or quarter panel of the vehicle 105, roof of the vehicle 102, hood/liftgate/trunk of the vehicle 102, etc. It is recognized that the portion of the vehicle 102 that houses the apparatus 106 may define a cavity (not shown) that is suitable to receive the apparatus 106.

The apparatus 106 generally includes a housing and cover (as shown in FIGS. 2-6), and at least one microphone element 120, (hereafter "the microphone element 120"). The microphone element 120 is generally configured to detect ambient noise external to the vehicle 102 and to provide the detected ambient noise to any controller (or processor) (not shown) positioned in or about the vehicle 105. In one example, the microphone element 120 may be implemented as a (MEMS) microphone. A printed circuit board (PCB) 116 supports the microphone element 120 and includes electrical traces and bonds to electrically couple with the microphone element 120.

The microphone apparatus 106 may also include an actuation device or actuator device 126. This device may be configured to close an opening to the microphone element 120 to protect the element 120 from heat or water pressure. The actuation device 126 may act as a latch to close the opening. This is described in greater detail below with respect to FIGS. 2-6. FIGS. 2-4 illustrate a system where the actuation device 126 drives a housing containing the microphone element 120 such that the housing moves to a closed position relative to a cover. FIGS. 5-6 illustrate a system where the actuation device 126 drives a lid to a closed position with the housing remaining stationary with respect to the cover.

The vehicle 102 may include various vehicle ECUs 124 (electric control units). The ECUs 124 may include a powertrain control module configured to provide control of engine operating components, a body control module, among others. The ECUs 124 may provide a vehicle state indicative of a status of the vehicle such as drive, neutral, park, reverse, standby, etc.

The vehicle 102 may also include a global positioning system (GPS) module 128 configured to provide a current location and heading information. The location of the vehicle 102 may indicate the presence of the vehicle 102 at a specific establishment, such as a car wash.

The ECUs 124 and GPS module 128 may be included in the vehicle's computing platform. Further, the microphone apparatus 106 may include a computing platform as well, either via the PCB 116 or another component. Each of the microphone apparatus 106 and vehicle 102 may include a controller that may include one or more processors configured to perform instructions, commands and other routines in support of the processes described herein. For instance, the PCB 116 and/or the ECUs 124 may be configured to determine if and when to move the microphone apparatus 106 into a closed position to protect the microphone element 120. At least one of the controllers may instruct the actuation device 126 to move a cover element (i.e., the housing or a cover or a lid), to achieve the closed position. The controller may also instruct the actuation device 126 to move back to an open position so that the microphone apparatus 106 may continue acquiring noise signals from the exterior of the vehicle 102.

The controller may determine that the microphone apparatus 106 should be in the closed position in response to receiving an indication of an environmental condition relevant to the microphone protection. In one example, this indication may come in response to the ECU 124 indicating that the vehicle 102 is in a certain state, such as park or neutral. In the park and neutral states, autonomous features may not be in use or needed and therefore signals provided by the microphone apparatus 106 may not be necessary. In this case, to protect the microphone apparatus 106, the controller may instruct the apparatus 106 to move into the closed position. Notably, during a car wash, the vehicle 102 is assumed to be in park, or possibly neutral for automatic car washes. Thus, in these states, the apparatus 106 will be closed and thus protected from any potential high pressure or heat.

In another example, the indication may be received from the GPS module 128 indicating the location of a vehicle 102 at a known car wash establishment. This too may trigger the apparatus 106 to close and thus protect the microphone element 120. In this example, the apparatus 106 may close regardless of the vehicle state received from the ECUs 124. Additionally or alternatively, both indications may be required prior to the controller sending instructions for the apparatus 106 to close.

Such instructions and other data may be maintained in a non-volatile manner using a variety of types of computer-readable storage medium (not shown). The computer-readable medium (also referred to as a processor-readable medium or storage) includes any non-transitory medium (e.g., a tangible medium) that participates in providing instructions or other data that may be read by the processor or controllers described herein. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The vehicle 102 may be in communication with a network 130 such as a cloud network, packet-switched network services (e.g., Internet access, VoIP communication services), cellular telephone network, etc. Data may be transmitted between the vehicle and the network 130. In one example, GPS locations associated with known car wash establishments may be transmitted and used to indicate the presence of a vehicle at such locations.

FIGS. 2A-E illustrate a cross-sectional view of the external microphone apparatus 106 in accordance to one embodiment. These figures illustrate an example system having a housing 142 and a cover 144 cooperating with one another to surround the microphone element 120. The cover 144 is generally orientated to face out from, and away from the vehicle 102 into the environment that surrounds the vehicle 105. As explained above, the microphone element 120 may be implemented as a MEMS microphone. The cover 144 defines a first opening 148 to enable the microphone element 120 to detect audio external to the vehicle 102. The first opening 148 enables the entry of the acoustic sound without transforming the sound prior to receipt by the microphone element 120.

The PCB 116 supports the microphone element 120. A sealing element 138 may be arranged between the cover 144 and the PCB 116. A sealing element 138 may optionally be provided and positioned between the cover 104 and the grilled cover 110. In one example, the sealing element 138 may be formed of foam and shaped in the form of a pad. The sealing element 138 may prevent vibrations between the apparatus 106 and the vehicle 105.

The sealing element 138 and/or PCB 116 may each define a second opening 152 to enable ambient sound that passes through the first opening 108 to be received by the microphone element 120. In this example, an acoustic membrane 150 is positioned between the PCB 116 and the cover 104. The acoustic membrane 150 is generally configured to enable the audio to pass therethrough and into the second opening 152 for receipt by the microphone element 120. In one example, the acoustic membrane 150 may be made of Gore-Tex® or any other suitable material, including water and/or weatherproof material or materials.

The acoustic membrane 150 is configured to serve as a barrier to prevent the entry of debris externally from the vehicle 102 into an interior volume of the housing 142. For example, the acoustic membrane 150 protects the microphone element 120 from water and/or dust or other debris. As shown, the microphone element 120 is positioned on one side of the PCB 116 and the acoustic membrane 150 is positioned on an opposite side of the PCB 116. It is recognized that the acoustic membrane 150 may require protection against a direct spray of water (e.g., water being delivered to the acoustic membrane that exceeds a predetermined pressure amount). The membrane 150 may also need protected against heat created by steam or water. The actuation device 126 (not shown in FIGS. 2-6), may drive the housing 142 between open and closed positions.

Figure 2A:
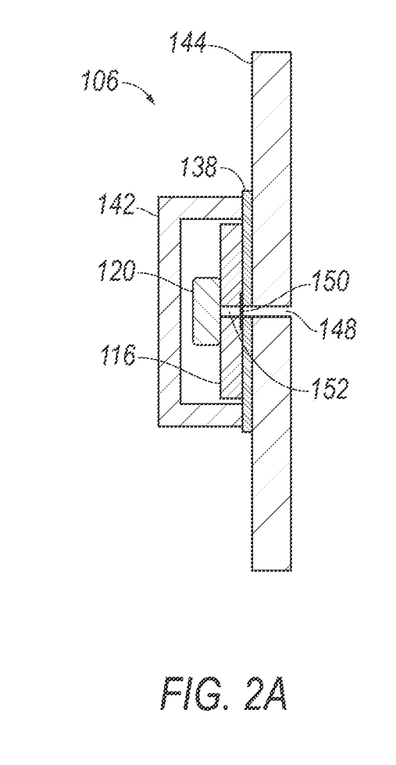
FIGS. 2A-D illustrate a cross-sectional view of a external microphone apparatus in accordance to one embodiment where

FIG. 2A illustrates the external microphone apparatus 106 in an open position. This may be the normal position during certain vehicle states such as drive and reverse. This allows ambient noise to pass through the openings 148, 152 to the microphone element 120.

Figure 2B:
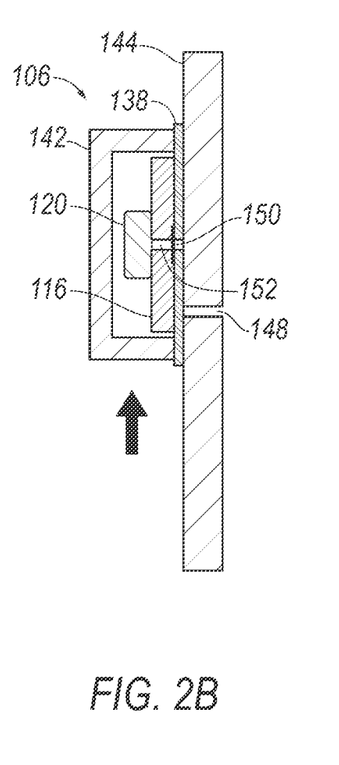

FIG. 2B illustrates the external microphone apparatus 106 in a closing position. In this position, the housing 140 is moving relative to the cover 144 so that the first opening 148 does not align with the second opening 152. The cover 144 blocks the second opening 152, thus protecting the membrane 150 from environmental conditions outside of the vehicle 102.

Figure 2C:
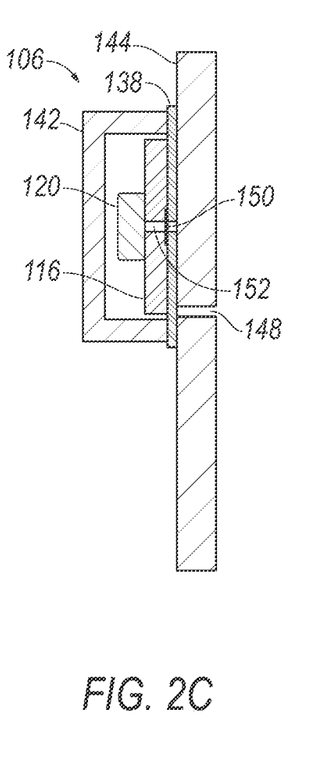

FIG. 2C illustrates the external microphone apparatus 106 in a closed position. As explained, the microphone apparatus 106 may be in a closed position during washing. As illustrated, the first and second openings 148, 152 are offset from one another, protecting the components inside the housing 140 from environmental conditions.

Figure 2D:
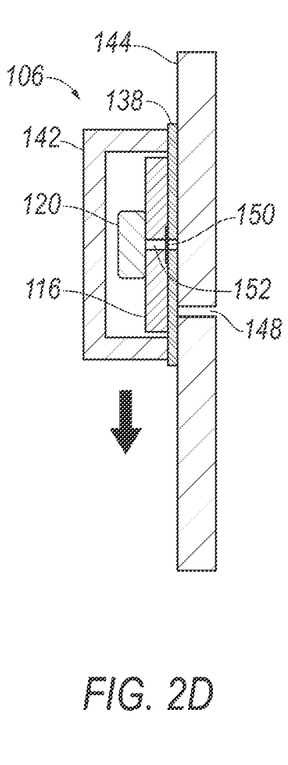

FIG. 2D illustrates the external microphone apparatus 106 in an opening position. In this position, once the environmental conditions have subsided, (i.e., the car was is complete), the housing 140 may return to the open position similar to FIG. 2A.

FIGS. 3A-E illustrate a cross-sectional view of another external microphone apparatus 106 in accordance with one embodiment. This example is similar to the example of FIGS. 2A-D, except that in this example, the membrane 150 is arranged between the PCB 116 and the sealing element 138. Regardless, the membrane 150 may need protected against high heat and pressure.

Figure 3A:
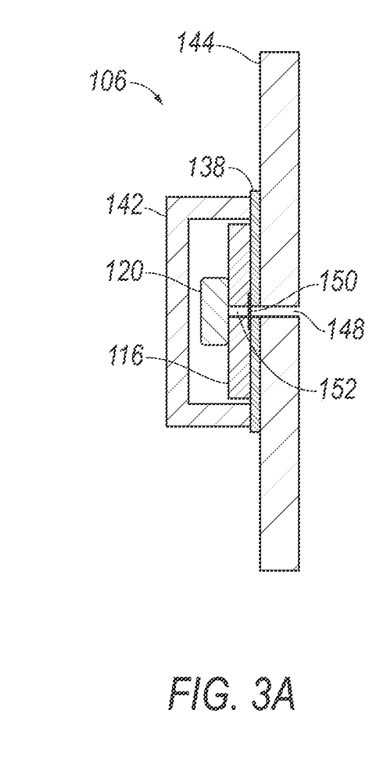
FIGS. 3A-D illustrate a cross-sectional view of another external microphone apparatus in accordance to one embodiment where
Figure 3B:
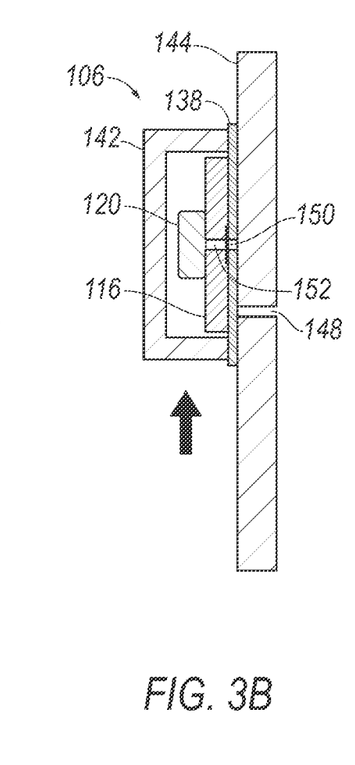
Figure 3C:
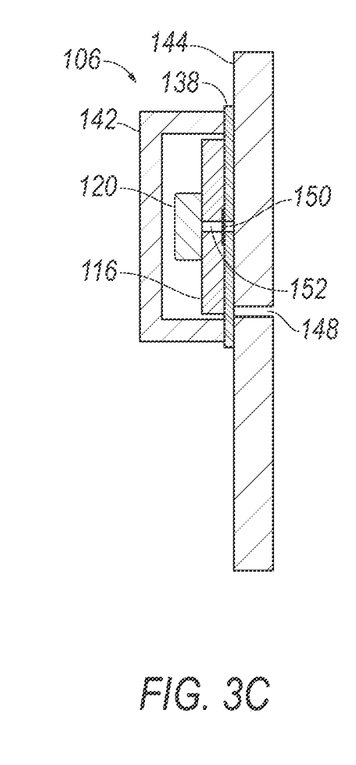
Figure 3D:
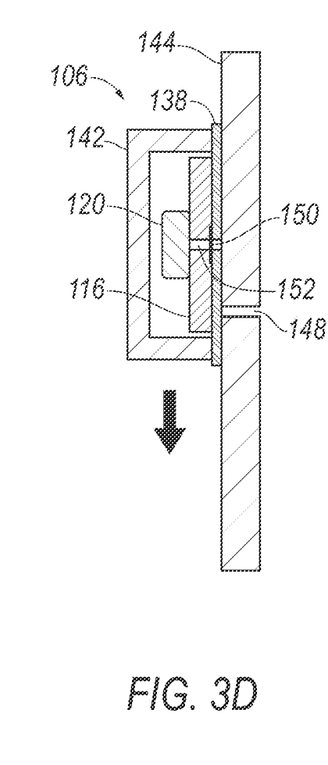

FIG. 3A illustrates the external microphone apparatus 106 in an open position. FIG. 3B illustrates the external microphone apparatus 106 in a closing position. FIG. 3C illustrates the external microphone apparatus 106 in a closed position. FIG. 3D illustrates the external microphone apparatus 106 in an opening position.

FIGS. 4A-E illustrate a cross-sectional view of another external microphone apparatus 106 having a second housing 158. This second housing 158 may surround the first housing 142. The second housing 158 may be fixed with respect to the cover 144. The housing 142 may move under certain environmental conditions similar to the examples described above, while the second housing 158 provides additional protection within the cavity of the vehicle 102 for which the microphone apparatus 106 sits.

Figure 4A:
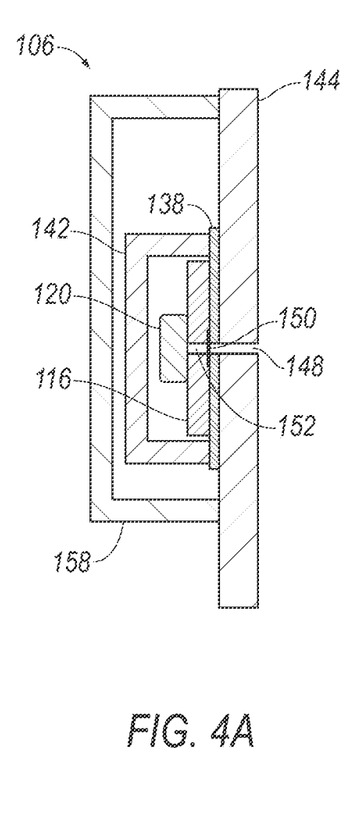
FIGS. 4A-D illustrate a cross-sectional view of another external microphone apparatus in accordance to one embodiment where
Figure 4B:
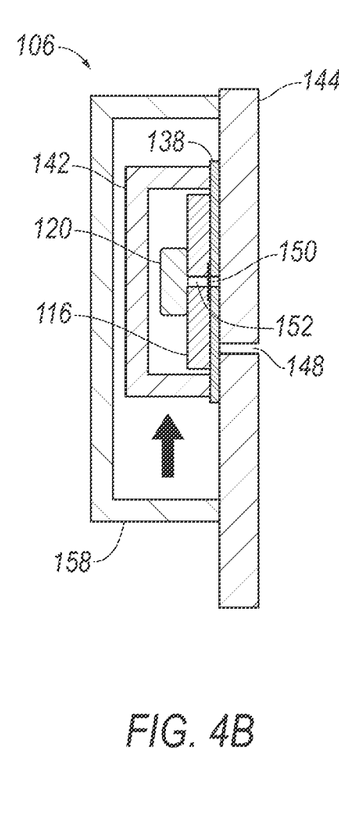
Figure 4C:
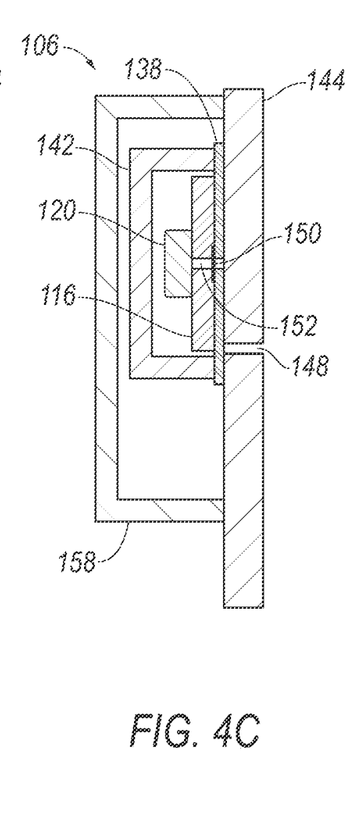
Figure 4D:
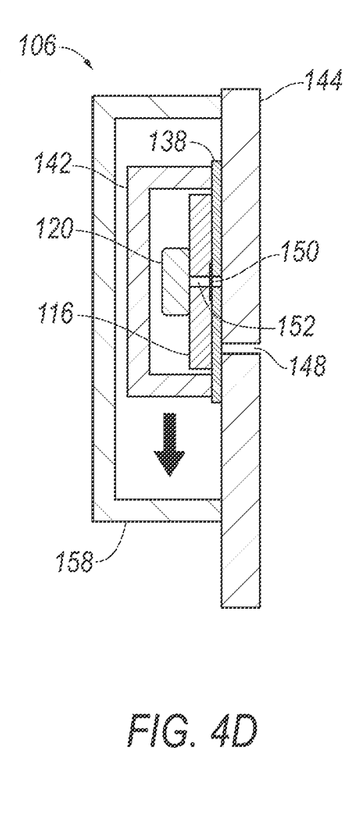

FIG. 4A illustrates the external microphone apparatus 106 in an open position. FIG. 4B illustrates the external microphone apparatus 106 in a closing position. FIG. 4C illustrates the external microphone apparatus 106 in a closed position. As explained, the microphone apparatus 106 may be in a closed position during car washing or other environmental conditions. FIG. 4D illustrates the external microphone apparatus 106 in an opening position.

FIGS. 5A-E illustrate a cross-sectional view of another external microphone apparatus 106 where a lid 160 is arranged between the sealing element 138 and the cover 144. The lid 160 may be driven by the actuation device 126 (not shown in FIG. 5) between an open and closed position in order to block and protect the second opening 152. In this example, the housing 142 may remain stationary and the lid 160 may move in response to certain environmental conditions. The lid 160 may be configured to slide between the sealing element 138 and the cover 144. In another example, the lid 160 may be a door hinged at the first opening 148 and configured to open and close. Other examples of the lid 160 may also be appreciated.

Figure 5A:
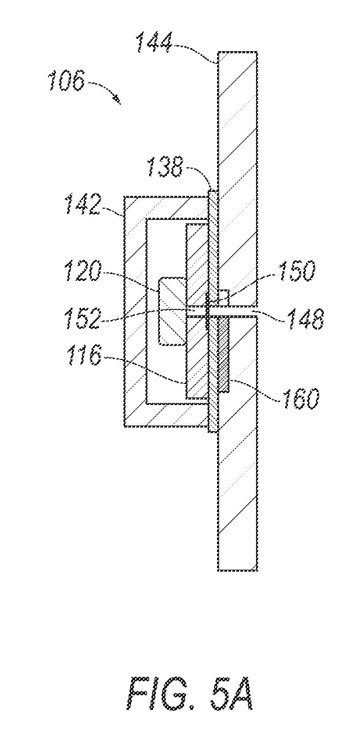
FIGS. 5A-D illustrate a cross-sectional view of another external microphone apparatus in accordance to one embodiment where
Figure 5B:
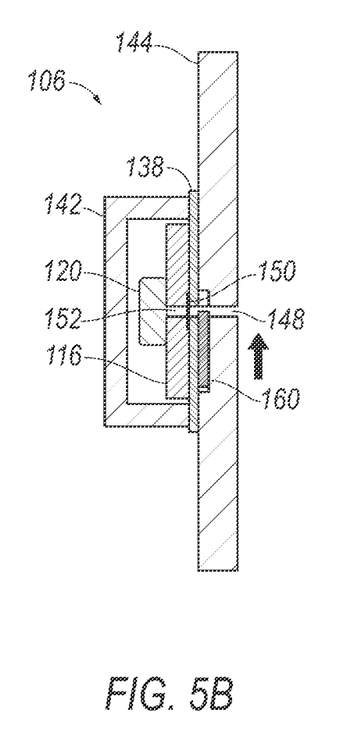
Figure 5C:
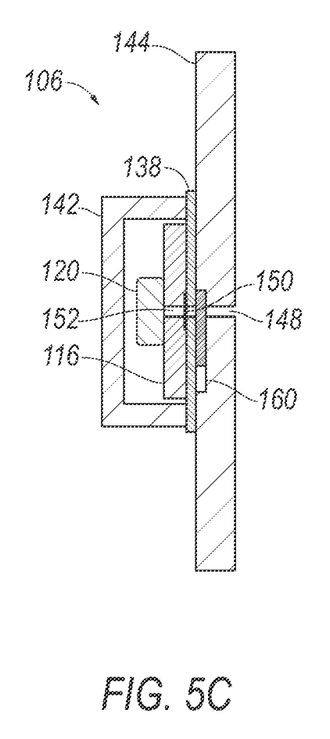
Figure 5D:
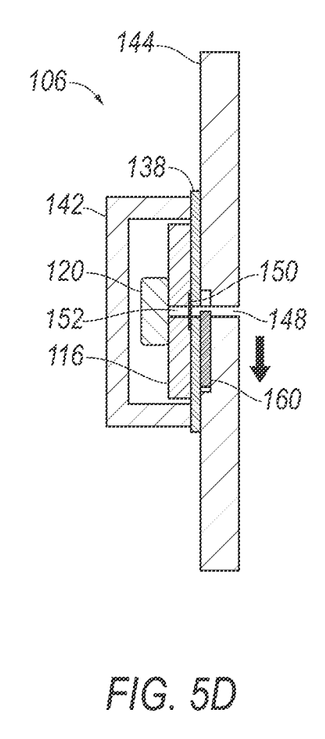

FIG. 5A illustrates the lid 160 of external microphone apparatus 106 in an open position. FIG. 5B illustrates the lid 160 of the external microphone apparatus 106 in a closing position. FIG. 5C illustrates the lid 160 of the external microphone apparatus 106 in a closed position, for example, during a car wash. FIG. 5D illustrates the lid 160 of the external microphone apparatus 106 in an opening position.

FIGS. 6A-E illustrate a cross-sectional view of another external microphone apparatus 106 where the lid 160 is arranged on an exterior side of the cover 144. The lid 160 may function similarly to that of the system of FIG. 5, but on the exterior of the apparatus 106.

Figure 6A:
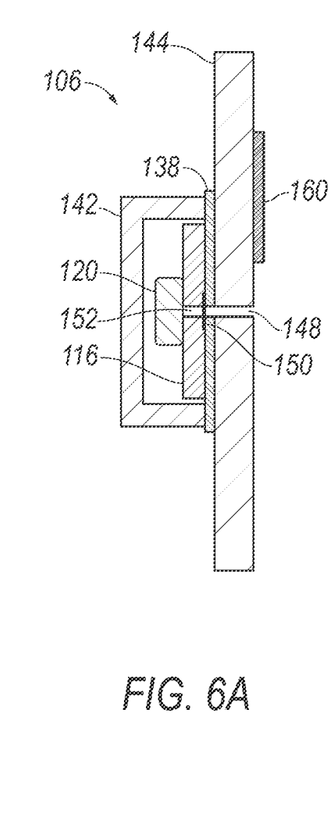
FIGS. 6A-D illustrate a cross-sectional view of another external microphone apparatus in accordance to one embodiment where
Figure 6B:
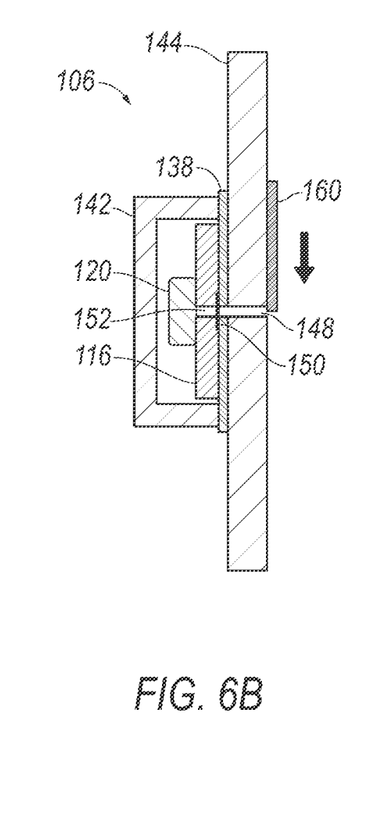
Figure 6C:
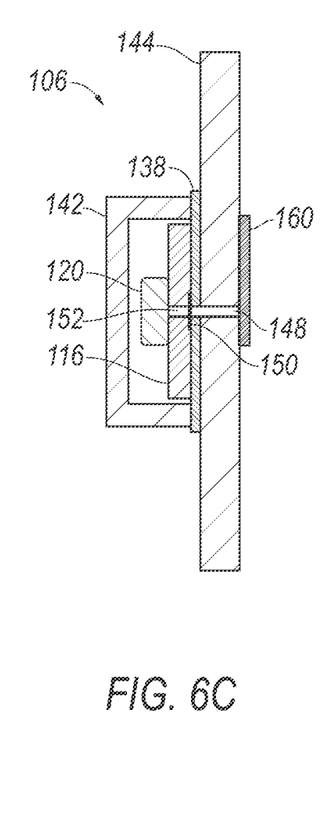
Figure 6D:
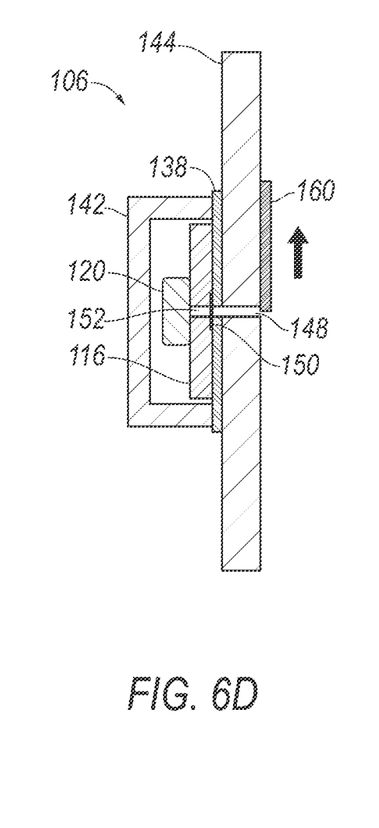

FIG. 6A illustrates the lid 160 of the external microphone apparatus 106 in an open position. FIG. 6B illustrates the lid 160 of the external microphone apparatus 106 in a closing position. FIG. 6C illustrates the lid 160 of the external microphone apparatus 106 in a closed position. FIG. 6D illustrates the lid 160 of the external microphone apparatus 106 in an opening position.

Figure 7:
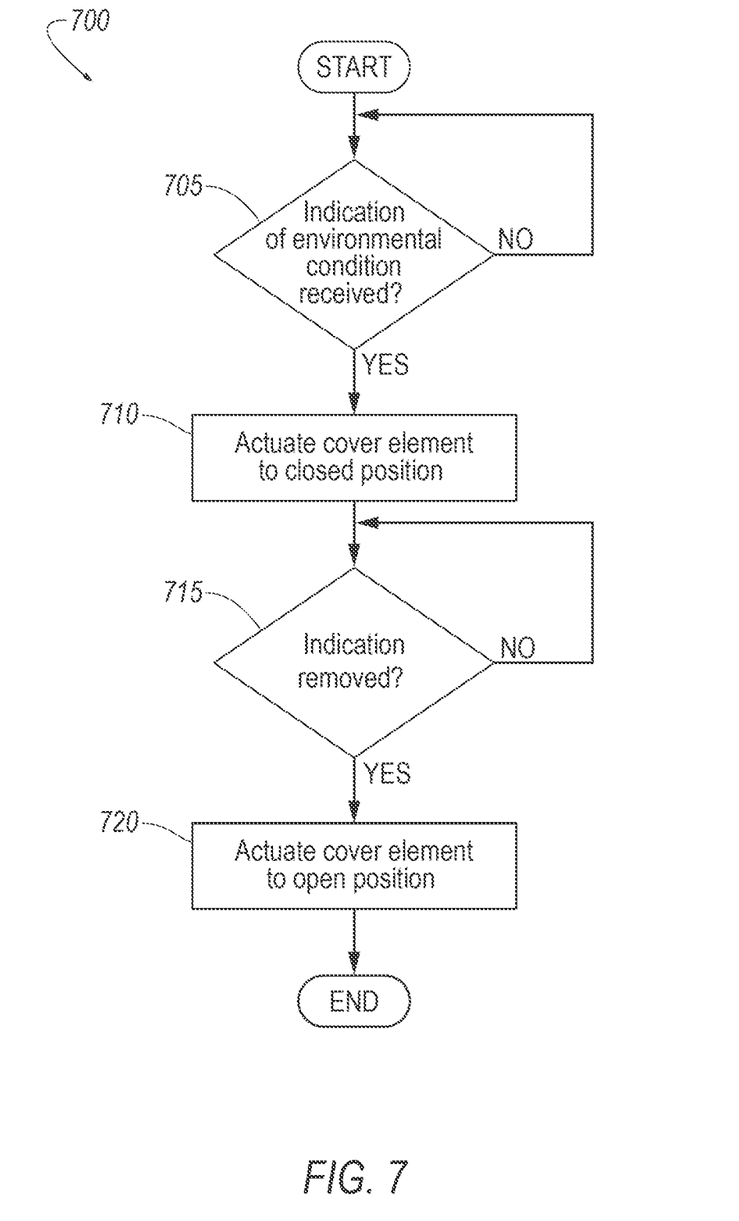
FIG. 7 illustrates an example flow chart for the system of FIG. 1.

FIG. 7 illustrates an example flow chart for the system of FIG. 1 including a process 700 for determining the position of the apparatus 106. The process 700 begins at block 705 where the controller determines whether an indication of an environmental condition relevant to microphone protection has been received. As explained above, this indication may be a vehicle state, such as park or neutral. In another example, the indication may be a location associated with a car washing facility. If the indication has been received, the process 700 proceeds to block 710. If not, the process 700 returns to block 705.

At block 710, the controller may instruct the actuation device 126 to move the cover element to a close position. The cover element may include the housing 142, similar to the examples in FIGS. 2-4. The cover element may also include the lid 160, similar to the examples in FIGS. 5 and 6. The cover element may move to misalign the first and second openings 148, 152. By misaligning the openings 148, 152, the membrane 150 may be blocked by the cover 144 or the lid 160 and thus be protected by external and environmental conditions such as hot water and high pressure from a car wash.

At block 715, the controller may determine whether the indication has changed. For example, has the vehicle location moved and thus is it no longer at the car wash facility? Additionally or alternatively, the controller may determine whether the vehicle state has changed. If so, the process 700 proceeds to block 720. If not, the process 700 remains at block 715.

At block 720, the controller may instruct the actuation device 126 to move the cover element to an open position. The process 700 may then end.

While examples shown and described herein are generally related to a single microphone, it is to be understood that this disclosure is scalable for array microphones. A single system could control the closing and opening for all the microphones. Additionally or alternatively, several systems synchronized systems could control the closing and opening each of the microphones. Further, depending on the curvature of the vehicle surface upon which the microphone is arranged, more than one microphone may share a lid or cover element. Other microphones may be associated with a specific lid or cover element.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microphone apparatus for attachment to an exterior portion of a vehicle, the apparatus comprising:
   a housing maintaining a printed circuit board (PCB) and a microphone element positioned on the PCB;
   a sealing element arranged on one side of the housing and defining at least one housing opening; and
   a cover extending over the sealing element and defining a cover opening configured to align in an open state with the housing opening to enable ambient sound external to the vehicle to be transmitted to the microphone element, and the cover configured to block the housing opening in a closed state to protect the microphone element.

2. The microphone apparatus of claim 1, further comprising an actuator configured to move the housing between the open and closed states.

3. The microphone apparatus of claim 1, further comprising a membrane arranged over the housing opening to act as a barrier to prevent the entry of debris at the openings.

4. The microphone apparatus of claim 3, wherein membrane is arranged between the sealing element and the cover.

5. The microphone apparatus of claim 3, wherein the membrane is arranged between the PCB and the sealing element.

6. The microphone apparatus of claim 1, further comprising a controller configured to:
   receive an indication of an environment condition relevant to microphone protection; and
   in response to the indication, instruct the housing to move to the closed state.

7. The microphone apparatus of claim 6, wherein the indication is a vehicle state of park or neutral.

8. The microphone apparatus of claim 6, wherein the indication is a vehicle location associated with a car washing facility.

9. A microphone apparatus for attachment to an exterior portion of a vehicle, the apparatus comprising:
   a housing maintaining a printed circuit board (PCB) and a microphone element positioned on the PCB;
   a sealing element arranged on one side of the housing and defining at least one housing opening to enable ambient sound external to the vehicle to be transmitted to the microphone element; and
   a lid extending over the sealing element and movable between an open state and a closed state, the lid configured to cover the housing opening in the closed state to protect the microphone element from environmental conditions.

10. The microphone apparatus of claim 9, further comprising an actuator configured to move the lid between the open and closed states.

11. The microphone apparatus of claim 10, further comprising a membrane arranged over the housing opening to act as a barrier to prevent the entry of debris at the openings.

12. The microphone apparatus of claim 11, further comprising a cover extending over the sealing element and defining a cover opening configured to align with the housing opening to enable ambient sound external to the vehicle to be transmitted to the microphone element.

13. The microphone apparatus of claim 12, wherein membrane is arranged between the sealing element and the cover.

14. The microphone apparatus of claim 13, wherein the membrane is arranged between the PCB and the sealing element.

15. The microphone apparatus of claim 10, further comprising a controller configured to:
   receive an indication of an environment condition relevant to microphone protection; and
   in response to the indication, instruct the lid to move to the closed state.

16. The microphone apparatus of claim 15, wherein the indication is a vehicle state of park or neutral.

17. The microphone apparatus of claim 16, wherein the indication is a vehicle location associated with a car washing facility.

18. A microphone system for protecting a microphone on an exterior of a vehicle, comprising:
   a housing maintaining a printed circuit board (PCB) and a microphone element positioned on the PCB;
   a sealing element arranged on one side of the housing and defining at least one housing opening to enable ambient sound external to the vehicle to be transmitted to the microphone element;
   a cover element extending over the sealing element and configured to affect an open and a closed state on the sealing element; and
   a controller configured to:
      receive an indication of an environment condition relevant to microphone protection, and
      in response to the indication, instruct the cover element to affect a closed state on the sealing element.

19. The system of claim 18, wherein the cover element is a lid arranged adjacent to the housing opening to obstruct the housing opening in the closed position.

20. The system of claim 18, wherein the indication is a vehicle location associated with a car washing facility.

\* \* \* \* \*